United States Patent [19]

Boyd et al.

[11] 4,396,199

[45] Aug. 2, 1983

[54] FLUID PRESSURE SEALING MEMBER FOR A VALVE

[75] Inventors: Marshall J. Boyd, Oreland; Robert A. DiDomizio, Jr., Lansdale; Richard C. Hobbs, Philadelphia, all of Pa.

[73] Assignee: Honeywell Inc., Minneapolis, Minn.

[21] Appl. No.: 263,814

[22] Filed: May 15, 1981

[51] Int. Cl.³ ............................................. F16K 25/00
[52] U.S. Cl. ................................ 277/167.5; 251/173; 251/306
[58] Field of Search ............................ 251/306, 173; 277/167.5, 12

[56] References Cited

U.S. PATENT DOCUMENTS 4,113,268  9/1978  Simmons et al. ................... 251/306
4,266,752  5/1981  Johnson ............................ 277/167.5
4,293,116  10/1981  Hinrichs ........................... 251/173

Primary Examiner—Robert I. Smith

Attorney, Agent, or Firm—Lockwood D. Burton; Mitchell J. Halista

[57] ABSTRACT

A butterfly valve having a valve body and a valve disc which is selectively rotated to produce a fluid-tight engagement of a peripheral edge of the disc with an annular seal or wall defined by a portion of an internal fluid passage in the valve body uses an annular fluid pressure seal member mounted in an annular groove in the valve body adjacent to the annular seat. The seal member is a layered structure including a pair of coaxial metallic annular seal rings having aligned J-shaped inner sides arranged in a facing relationship and a resilient annular seal ring captured between the metallic rings and having a sealing surface aligned with an outside surface of the J-shaped sides. The sealing surface of the resilient seal ring and an outside surface of the J-shaped sides are arranged to produce the fluid-tight engagement with the peripheral edge of the valve disc.

21 Claims, 3 Drawing Figures

FLUID PRESSURE SEALING MEMBER FOR A VALVE

BACKGROUND OF THE INVENTION

1. Field of the Invention

The present invention relates to valves. More specifically, the present invention is directed to a valve seal for producing a bi-directional fluid-tight and fire-safe seal on a valve sealing member.

2. Description of the Prior Art

Valves having a valve body and a valve sealing member rotatably mounted in a fluid passage therein are well-known in the art as is shown in the case of a so-called butterfly valve in U.S. Pat. No. 2,987,072. The provision for a separate resilient seal positioned in an annular groove of the wall defining the internal fluid passage of the valve body and encircling the valve sealing member or disc to engage a circumferential periphery of the valve disc and to create a seal thereby against fluid flow through the fluid passage when the valve disc is in its closed position is also shown in the aforesaid patent. Another example of a butterfly valve with a fluid pressure sealing ring or resilient member is shown in U.S. Pat. No. 3,771,763. Such prior art valve sealing members have generally not been adaptable to the provision of a metal-to-metal seal which is essential in providing a so-called "fire safe" valve as discussed in the July 17, 1978 edition of the "Oil and Gas Journal" in an article entitled "Fire Safe Valve Specs Summarized" by James Azzinaro. Some prior art attempts to provide a "fire safe" valve seal structure are shown in U.S. Pat. Nos. 3,986,699; 4,113,268; 4,130,285 and 4,162,782. Such prior art valve sealing mechanisms have significant inherent limitations such as either a failure to provide bi-directional "fire safe" sealing capability or a premature and rapid wear of the sealing face of the resilient element and the sealing edge of the valve disc which ultimately results in a fluid leak through the valve.

Accordingly, it would be desirable to provide a valve sealing structure which is adaptable for "fire safe" valve operations as well as other valve applications in a normal temperature environment while minimizing the effects of wear on the valve seal to avoid premature deterioration of the valve resulting in fluid leakage.

SUMMARY OF THE INVENTION

An object of the present invention is to provide an improved fluid sealing element for a valve.

Another object of the present invention is to provide an improved fire-safe fluid sealing element for a butterfly valve.

In accomplishing these and other objects, there has been provided, in accordance with the present invention, a valve seal having a pair of annular valve seal rings having inwardly curved inner ends in a facing relationship with a resilient sealing member having a sealing face and being captured therebetween to form a layered seal structure. The layered seal structure is in a wall of a fluid path retained within an annular groove in a chamber within a valve body with the curved ends and the sealing face providing a fluid seal on a peripheral edge of a valve disc selectively rotatable within the valve chamber.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

DETAILED DESCRIPTION

Figure 1:
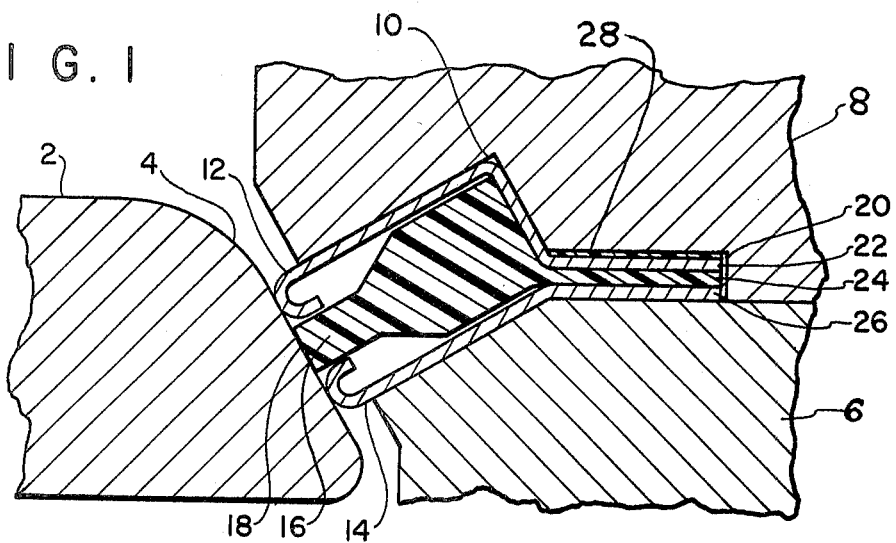
FIG. 1 is a cross-sectional partial side view of a butterfly valve using an example of a valve seal embodying the present invention.

Referring to FIG. 1 in more detail, there is shown a partial cross-sectional side view of a butterfly valve having a rotatable valve disc 2 with a peripheral sealing edge 4. A valve body 6 and a valve seal clamp ring 8 are arranged to retain a valve seal member within a first annular groove 10 defined by the valve body 6 and the clamp ring 8. The valve seal member includes a first metallic annular seal ring 12 and a second metallic annular seal ring 14, each having inwardly curved or J-shaped inner sides, i.e., along an inner diameter. The first and second seal rings 12, 14 may be made of any suitable material, e.g., stainless steel. A resilient annular seal ring 16 having an inner diameter sealing face 18 aligned with the inner sides of the rings 12 and 14 is located between the seal rings 12 and 14. The resilient seal ring 16 may be made of any suitable material, e.g., polytetrafluoroethylene. The seal rings 12 and 14 have outer diameter extensions or ribs 22 and 24, respectively, while the resilient member 16 has an outer diameter extension or rib 26. The extensions 22, 24 and 26 are retained in a layered arrangement within a second recess 20 communicating with the first groove 10 and located between the valve body 6 and the clamp ring 8 to restrain the valve seal member within the first recess 10 and to provide a fluid-tight seal between the clamp ring 8 and the valve body 6. A gasket ring 28 may also be used in the recess 10 to assist the fluid-tight seal between the clamp ring 8 and the valve body 6.

The J-shaped inner sides of the seal rings 12 and 14 are arranged to be in contact with the sealing edge 4 of the disc 2 during normal operation of the valve during a fluid sealing operation, i.e., when the valve disc 2 is rotated to a valve closed position. The sealing face 18 of the resilient seal ring 16 is also arranged to be concurrently in contact with the sealing face 4 of the disc 2. During the closing operation of the valve, the disc 2 is ultimately rotated to the position shown in FIG. 1. The resilient mounting of the rings 12, 14, 16 on the ribs 22, 24 and 26 allows the rings 12, 14, 16 to move slightly outwardly to provide a self-aligning characteristic while maintaining a contact with the peripheral edge 4 of the disc 2. This resilient mounting of the rings 12, 14, 16 significantly reduces the wear of their respective inner sides caused by abrasion with the peripheral edge 4 of the disc 2.

When the disc 2 is finally in the position shown in FIG. 1, the fluid pressure of the fluid controlled by the valve is effective to displace the metallic seal ring on the high pressure side of the resilient element 16 away from a position wherein its inner J-shaped side is in contact with the sealing face 4 of the disc 2. This action allows fluid pressure to be applied to the adjacent surface of the sealing element 16 to induce a pressure assisted seal of the sealing face 18 against the sealing face 4 of the disc 2. In other words, the fluid pressure is effective to move the seal ring 16 by a bending of the extension 26 to urge the sealing face 18 against the sealing face 4 of the disc 2. Any leakage of the fluid past the fluid sealing face 18 of the resilient seal ring 16 is effective to induce a higher contact pressure of the J-shaped side of the other sealing ring of the sealing rings 12 and 14 on the sealing face 4 of the disc 2 by exerting a pressure on the J-shaped end of the seal ring. The pressure assisted sealing of the J-shaped inner side is effected by a bending of the metallic seal ring on its associated extension, e.g., ring 12 on extension 22. The motion of the J-shaped side of the metallic seal ring during a pressure assisted operation against the sealing face 4 of the disc 2 is limited by the adjacent wall of the annular groove 10 to prevent the J-shaped side from being driven past the point of contact with the sealing face 4. For example, assuming the high pressure fluid initially contacts the second metallic seal ring 14, i.e., the second seal ring 14 is on the upstream side of the valve, the J-shaped side of the second ring 14 is moved out of contact with the sealing face 4 while the sealing face 16 is urged into contact with the sealing face 4. Similarly, the downstream metallic ring 12 has its J-shaped inner side urged into contact with the sealing face 4.

In the event of a high temperature destruction or distortion of the resilient seal ring 16, the fluid pressure continues to force the J-shaped end of the metallic seal ring on the low pressure side or down-stream side of the damaged resilient sealing element 16 against the sealing face 4 of the disc 2 to provide a "fire safe" valve seal operation. Thus, the metallic seal rings 12, 14 are effective to provide a fluid seal on the sealing face 4 to maintain a closed state of the valve after the resilient seal ring 16 has been rendered ineffective by a high temperature exposure of the valve, e.g., by a fire in the vicinity of the valve. Since the seal rings 12, 14, 16 are pressure assisted in either direction of the application of the high pressure fluid, the normal operation and the "fire-safe" operation of the valve are bi-directional to enhance the universality of the valve.

Figure 2:
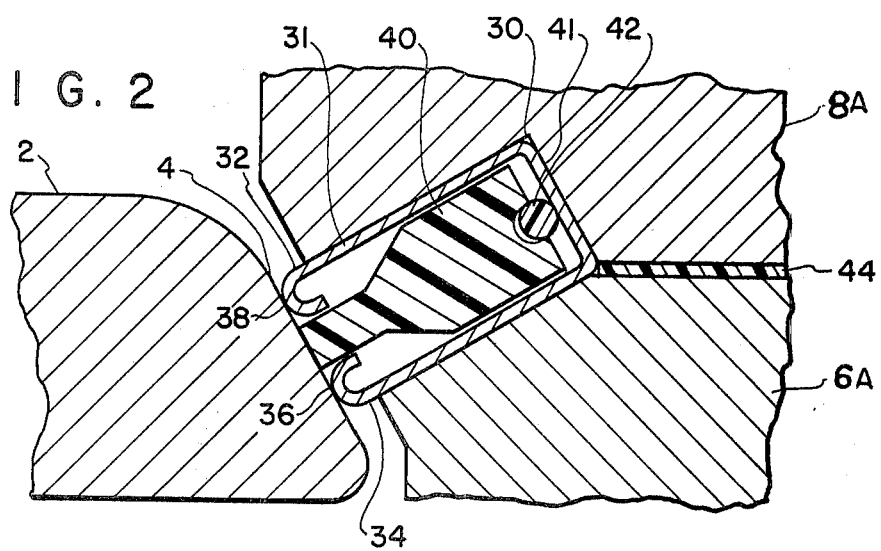
FIG. 2 is a cross-sectional partial side view of a second example of an embodiment of the present invention and FIG. 3 is a third example of an embodiment of the present invention also shown in a cross-sectional partial side view.

In FIG. 2, there is shown a second example of an embodiment of the present invention wherein the sealing member is positioned in a tapered recess 30 formed by the valve body 6A and clamp ring 8A. The tapering of the recess 30 is arranged to assist in the retaining of the sealing member within the recess 30. The sealing member includes a metallic U-shaped sealing ring 31 having a pair of outwardly extending arms 32, 34 with each arm terminating in a J-shaped end, 36, 38, respectively. A resilient seal ring 40 is retained within the U-shaped seal ring 32. An "O" ring 42 is located between the resilient seal ring 40 and the inner surface of an outer wall or partition 41 of the U-shaped seal ring 31. The "O" ring 40 serves as a fluid seal between the resilient seal ring 40 and the metallic seal ring 31. A gasket 44 is located between the valve body 6A and the seal ring 8A to provide a fluid tight seal therebetween. The operation of the embodiment of the invention shown in FIG. 2 is similar to that described above with respect to the embodiment shown in FIG. 1 with the exception that the metallic seal ring 31 does not have extensions which are clamped between the valve body 6A and seal ring 8A. Similarly, the resilient seal ring 40 does not have an extension which is clamped between the valve body 6A and the seal ring 8A. Thus, the fluid sealing operation is characterized by a fluid pressure assisted operation is effected by a bending of the metallic seal ring 31 to enable the arms 32 and 34 to move within the recess 30. On the other hand, the movement of a resilient seal ring 40 is effected by a movement of the seal ring 40 on the "O" ring 42 either separately or in combination with a movement of the "O" ring 42 on the inner surface of the partition 41. Thus, the embodiment of the invention shown in FIG. 2 retains the contact and resilient movement of the metallic seal ring 31 and the resilient seal ring 40 to minimize premature wear of their sealing surfaces as well as providing the fire-safe operation of the metallic seal ring on the peripheral sealing surface 4.

Figure 3:
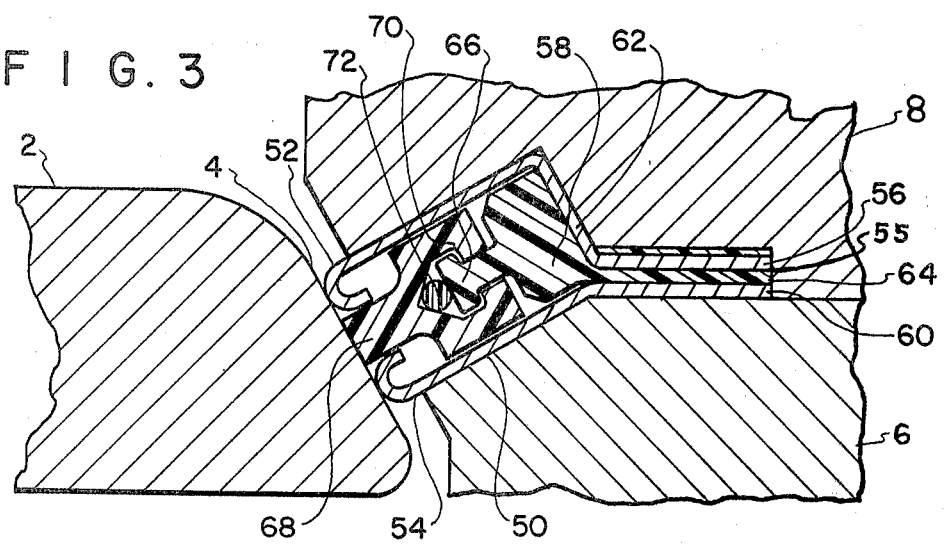

In FIG. 3, there is shown a third example of an embodiment of the present invention wherein the sealing member is retained in a groove 50 defined by the valve body 6 and seal ring 8. The sealing member includes a first metallic seal ring 52 and a second metallic seal ring 54 similar to those described above with respect to FIG. 1 as seal rings 12 and 14. A recess 55 is provided between the valve body 6 and seal ring 8 to retain extensions of the seal rings 52 and 54, i.e., extensions 56 and 60, respectively. A metallic retaining ring 62 has an annular extension 64 which is positioned between the extensions 56 and 60 of the seal rings 52 and 54 within the recess 55 and is retained thereby. The metallic retaining element 62 has an outwardly projecting extension 66 in the form of an annular ridge. The ridge 66 is arranged to retain a resilient seal ring 68 between the metallic seal rings 52 and 54 by having the ridge 66 seated within a cavity 70 located in an outer diameter side of the resilient seal ring 68. In order to provide a further fluid seal between the resilient seal ring 68 and the ridge 66, an "O" ring 72 is located within the cavity 70 between the ridge 66 and the wall of the cavity 70. Since the metallic retaining element 62 would be unaffected by a high temperature operation, the replacement of the resilient seal ring 68 is effected by mounting a new resilient seal ring and "O" ring 72 on the ridge 66. The elimination of the extension of the resilient seal ring 68 is compared to that shown in FIG. 1, improves the replacement operation of the resilient seal ring 68 as well as reducing its cost by minimizing the amount of material required. The fluid sealing operation of the sealing member shown in FIG. 3 is also substantially the same as that described above for FIG. 1 with the metallic seal rings 52 and 54 providing a fire-safe operation while the resilient movement of the metallic seal rings 52 and 54 and the resilient seal ring 68 minimizes the wear of these elements on the peripheral sealing face 4 of the valve disc 2.

Accordingly, it may be seen that there has been provided, in accordance with the present invention an improved valve seal having bi-directional fluid sealing capabilities while providing a fire-safe seal.

The embodiments of the invention in which an exclusive property or privilege is claimed are defined as follows:

1. A fluid seal comprising
   a first annular seal ring having a J-shaped radially inward side,
   a second annular seal ring having a J-shaped radially inward side arranged with a curved end thereof in a facing relationship with a curved end of said J-shaped radially inward side of said first seal ring and spaced therefrom and a third annular seal ring captured between said first and second seal rings and having a radially inward seal face aligned with an outer surface of said J-shaped radially inward sides of said first and second seal rings.

2. A fluid seal as set forth in claim 1 wherein said first and second seal rings are metallic seal rings.

3. A fluid seal as set forth in claim 2 wherein said third seal ring is a resilient material seal ring.

4. A fluid seal as set forth in claim 1 wherein said first, second and third seal rings having integral extensions forming their respective radially outward sides and arranged in a layered relationship.

5. A fluid as set forth in claim 1 wherein said first and second fluid seal rings are connected together by an integral partition between their radially outward sides.

6. A fluid seal as set forth in claim 5 and further including an "O" ring between said third seal ring and said partition.

7. A fluid seal as set forth in claim 5 wherein said first and second seal rings and said partition are metallic and said third seal ring is a resilient material seal ring.

8. A fluid seal as set forth in claim 1 wherein said third seal ring includes a radially inner annular seal and a radially outward seal mount, said radially inner seal having a peripheral groove therein and said seal mount having a peripheral ridge mating with said groove.

9. A valve comprising
a hollow valve body defining a cylindrical fluid passage,
an annular groove in a wall of said passage,
a fluid sealing valve disc located within said fluid passage and arranged for selective rotation to produce a fluid-tight engagement of a peripheral edge of said disc with a fluid seal located in said groove
an annular fluid seal positioned in said groove and including a first annular seal ring having a J-shaped radially inward side,
a second annular seal ring having a J-shaped radially inward side arranged with a curved end thereof in a facing relationship with a curved end of said J-shaped radially inward side of said first seal ring and spaced therefrom and
a third annular seal ring captured between said first and second seal rings and having a radially inward seal face aligned with an outer surface of said J-shaped radially inward sides of said first and second seal rings, said seal face and said outer surface of said J-shaped radially inward sides of said first and second seal rings projecting from said groove to contact said peripheral edge of said disc.

10. A valve as set forth in claim 9 wherein said first and second seal rings are metallic and said third seal ring is a resilient material seal ring.

11. A valve as set forth in claim 9 wherein said first, second and third seal rings have integral extensions forming their respective radially outward sides and arranged in a layered relationship and said valve body includes a recess communicating with said groove to capture said layered extensions therein.

12. A valve as set forth in claim 9 wherein said third seal ring includes a radially inward annular seal and a radially outward seal mount, said seal having a peripheral groove therein and said seal mount having a peripheral ridge mating with said groove.

13. A valve as set forth in claim 12 and further including an "O" ring between said ridge and an inner wall of said groove.

14. A valve as set forth in claim 12 wherein said first and second seal rings and said seal mount have integral extensions forming their respective radially outward sides and arranged in a layered relationship.

15. A valve as set forth in claim 12 wherein said first and second seal rings are metallic seal rings and said radially inward annular seal is made of a resilient material.

16. A valve as set forth in claim 9 wherein said first and second fluid seal rings are connected together by an integral partition between their radially outward sides.

17. A valve as set forth in claim 16 and further including an "O" ring between said third seal ring and said partition.

18. A valve as set forth in claim 16 wherein said first and second seal rings and said partition are metallic and said third seal ring is a resilient material seal ring.

19. A fluid seal as set forth in claim 16 and further including an "O" ring between said ridge and an inner wall of said groove.

20. A fluid seal as set forth in claim 16 wherein said first and second seal rings and said seal mount have integral extensions forming their respective radially outward sides and arranged in a layered relationship.

21. A fluid seal as set forth in claim 16 wherein said first and second seal rings are metallic seal rings and said radially inner annular seal is made of a resilient material.

* * * * *